Figure 1:
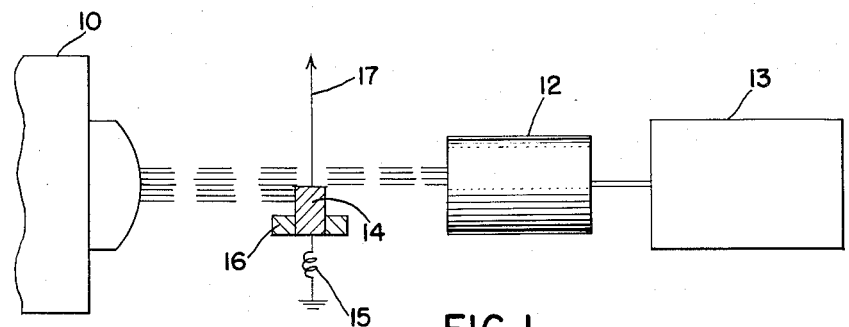

March 6, 1962  S. WANETICK  3,024,364

RADIO-ACTIVE TRANSDUCER

Filed Aug. 6, 1959

*INVENTOR.*
SAUL WANETICK

United States Patent Office 3,024,364
Patented Mar. 6, 1962

3,024,364
RADIO-ACTIVE TRANSDUCER
Saul Wanetick, Philadelphia, Pa., assignor to the United States of America as represented by the Secretary of the Army
Filed Aug. 6, 1959, Ser. No. 832,125
1 Claim. (Cl. 250—83.3)
(Granted under Title 35, U.S. Code (1952), sec. 266)

The invention described herein may be manufactured and used by or for the Government for governmental purposes without the payment to me of any royalty thereon.

This invention relates to transducers such as are operable to measure change in the velocity of a moving object, and has for its purpose to provide an improved transducer or accelerometer which is more rugged in structure and is less sensitive to change in its environment than the transducers theretofore available.

Many presently available transducers are operable to produce an effect dependent on their attaining a predetermined velocity. Such devices generally have not been altogether reliable in operation for the reason that their sensitivity is affected by variations in temperature, capacitance or the transverse forces they are subjected to during their operation. In accordance with the present invention these difficulties are avoided by the provision of a transducer which is rugged in structure, and depends for its operation on a source of radioactive emission.

The invention will be better understood from the following description when considered in connection with the accompanying drawings and its scope is indicated by the appended claim.

Figure 2:
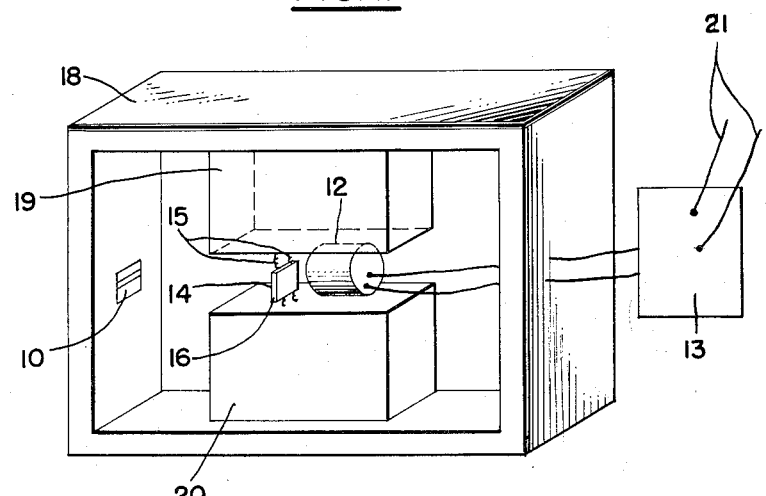

Referring to the drawings:

FIG. 1 is an explanatory diagram relating to the operation of the invention, and FIG. 2 is a detailed showing of the invention.

FIG. 1 shows a radioactive source 10 from which a collimated beam 11 of radioactive particles is directed toward a scintillation detector 12. This detector has its output connected to a counter 13 and may be in the form of a phosphor and a photomultiplier mounted within a tubular member in a manner well understood by those skilled in the art.

Between the source 10 and the scintillator tube 12 is a shield 14 which is resiliently supported by means such as a spring 15. This shield consists of a material such as aluminum which absorbs and obstructs the passage of radioactive particles. To make it responsive to velocity change, it is fixed to a mass 16.

Assuming these various parts to be assembled into a unitary structure as hereinafter indicated it can be seen that the shield 14 intercepts less of the beam 11 when the structure is accelerated in the direction of the arrow 17 and more of the beam when the structure is accelerated in the opposite direction. From this it follows that the number of particles reaching the scintillator is a measure of the acceleration imparted to the object. The number of these particles are registered on the counter 13 which may function to control an electric circuit or produce some other effect in response to a predetermined count.

FIG. 2 shows the above-identified parts as mounted in an enclosure 18. In this arrangement, the source 10 is shown as mounted on the wall of the enclosure. It may consist of a capsule which is associated with a narrow slit to form a narrow beam of radio-active particles.

Fixed to the top and bottom of the enclosure are supports 19 and 20. Mounted between these supports through the medium of springs 15 are the shield 14 and the mass 16 previously mentioned. Also mounted between the supports 19 and 20 are the scintillation detector 12. Obviously the detector and counter may be mounted in any other convenient location and the counter output leads 21 may be connected to a device which is to be operated upon the attainment of a predetermined acceleration, this device being located inside or outside the enclosure.

As will be apparent to those skilled in the art, the herein described device can be compact, and in a form which can take large overloads without breakage. It has the additional advantages that it is substantially independent of temperature variation, and is free from capacitance and transverse effects.

I claim:

An accelerometer for measuring acceleration of a mass in a direction normal to a path of a radiant energy beam, said accelerometer including a casing, a radio active source for transmitting a narrow beam of radio-active particles within said casing, a detector mounted in said casing for receiving energy from said source, a shield capable of absorbing energy from said source, a resilient support arranged normally to maintain said shield in the path of said beam, and a mass arranged with said support to move with said shield in a direction normal to said beam to an extent which is dependent on the acceleration of said mass and shield.

References Cited in the file of this patent
UNITED STATES PATENTS

| | | |
|---|---|---|
| 2,301,396 | Graff | Nov. 10, 1942 |
| 2,660,062 | Frowe | Nov. 24, 1953 |
| 2,688,702 | Fua | Sept. 7, 1954 |
| 2,883,555 | London | Apr. 21, 1959 |
| 2,904,692 | Gscheidlen | Sept. 15, 1959 |